July 3, 1934.  M. SCHNAIER  1,965,394
FROZEN CONFECTION
Filed Jan. 4, 1930
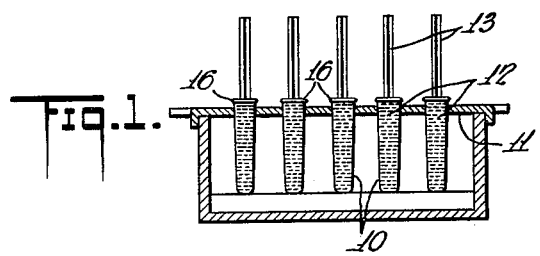
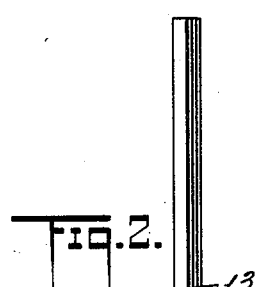
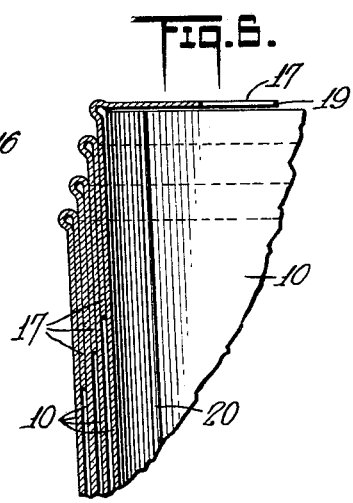
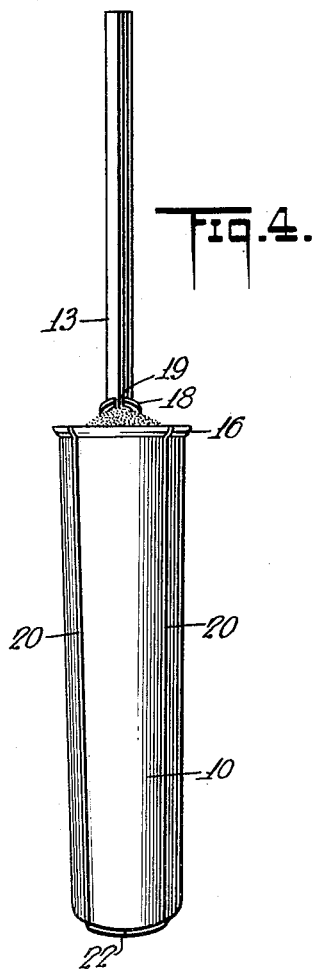
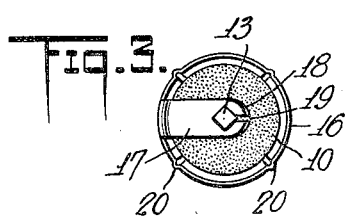
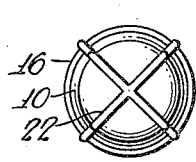
INVENTOR
*Milton Schnaier*
BY
*Dean, Fairbank, Obright & Hirsch*
ATTORNEYS Patented July 3, 1934

1,965,394

UNITED STATES PATENT OFFICE 1,965,394

FROZEN CONFECTION

Milton Schnaier, New York, N. Y., assignor to The Popsicle Corporation of the United States, a corporation of Delaware Application January 4, 1930, Serial No. 418,494

6 Claims. (Cl. 99—16)

My present invention relates to frozen confections and methods for manufacturing the same.

Among the objects of the invention are to provide a frozen confection which can be easily made at small cost, which may be conveniently consumed without contamination by contact with the hand of the consumer and without the need for a plate, spoon, fork or other implement.

The complete article of manufacture preferably includes a mass of edible material frozen into an enclosing shell that constitutes a part of the article handed to the customer and also frozen around a stick which protrudes and serves as a handle, while the confection is being eaten. The mold or container may be of inexpensive material that can be expeditiously and conveniently removed as by tearing from the frozen mass, just prior to the consumption of the confection. In the preferred method of manufacture, the container shell or wrapper constitutes a mold into which the syrup or other fluid is poured and then frozen. Accordingly, the necessity for removing the articles from the molds or freezing cans by the vendor or distributor is entirely eliminated as is the expense and delay of separately wrapping the confection in a protective cover after manufacture.

The shell or casing is preferably substantially non-absorbent, sufficiently stiff to serve as a mold, and at the same time of a construction that will facilitate removal from the confection. It is also important that the shell be of a composition or substance which will not taint or flavor the material molded therein. We may utilize any of various possible materials for the shell, but have accomplished satisfactory results by the use of paper composition or some equivalent matted fabric, impregnated with paraffin or equivalent substance.

The shell may be made in any of a variety of shapes and by any of numerous methods, and may include integral means for positioning or centering the sticks during the freezing operation.

The accompanying drawing indicates several embodiments of the invention, but it is to be understood that the drawing is illustrative of only a few of the structural variations which are contemplated.

In the drawing,

Fig. 1 is a perspective view on a small scale indicating a number of the improved molds supported in a rack during freezing, Fig. 2 is a view in longitudinal cross-section through the completed confection, Fig. 3 is a transverse sectional view of Fig. 2, Fig. 4 is a side elevation of the shell, Fig. 5 is a bottom plan view thereof, Fig. 6 is a fragmentary view illustrating the nesting of the shells, According to my invention, a number of molds 10 are carried upon a rack or tray 11 within a freezing chamber with a handle stick 13 in each mold. The material 12 to be frozen is poured into the molds, partly or completely filling the same. This material is a syrup which may have a milk or cream, but preferably has a water base to form a water ice or sherbet when frozen. The molds are preferably of suitable paper composition or similar inexpensive material, different embodiments of which are described hereinafter.

A preferred embodiment comprises a container or shell of test-tube form, molded from paper pulp impregnated with paraffin or with a suitable waterproofing wax.

The shell 10 is molded with an externally beaded rim 16 and an integral tab 17 extending inwardly from the rim is apertured as at 18, to embrace the handle stick 13 and serves to center the stick during the freezing operation. The stick is preferably of such length and specific gravity that the buoyant effect of the syrup or other fluid filling the mold will be insufficient to raise the stick out of contact with the bottom of the mold. In the expansion due to freezing the edible mass will tightly engage or grip both the shell and the stick, and will protrude in the manner of a cone 14 at the upper end. The frozen sherbet or water-ice mass 12 thus constitutes a secure binder between the handle stick and the shell or container.

After the edible material is frozen, the complete article, consisting of the handle, frozen confection and shell or wrapper may be bodily removed from the cooling chamber or brine tank. No more care need be exercised in the handling, storage, or shipment of the article than is commonly used in the shipment and storage of ice cream packed in paper cartons.

A slit 19 extending from the aperture 18 to the edge of the tab permits ready disconnection of the tab and stick to remove the shell preparatory to eating. Tab 17 is foldable inwardly so that it will not interfere with the nesting of the shells for storage purposes, as indicated in Fig. 6. The bead 16 at the base of the tab has, however, a resilient action so that the tab will substantially spring to transverse position for insertion of the handle stick. The shell includes a plurality of longitudinal grooves 20 which extend from the rim to and across the bottom to a common point of intersection 22. The tab 17 is grasped for peeling off a panel of the shell between two of the grooves 20, and the remaining panels may be similarly removed by grasping the beaded rim 16 thereof. The stick 13 as shown, extends the entire length of the confection, constituting a sustaining core therefor, the effectiveness of which is enhanced by the preferred angular cross-section of the stick shown, so that the frozen mass is, moreover, firmly keyed onto the stick. The grooves 20 on the interior of the cup provide additional anchorage for the frozen mass within the shell.

Inasmuch as it takes but a fraction of a minute to freeze the confection at the wall of the shell or container, exposed to the refrigeration, it is understood that the shell need be sufficiently waterproof merely to prevent leak during such short period, or possibly for the period of a few minutes for completing the congelation. There are certain advantages in permitting moisture at the outside of the shell, since in the evaporation of such moisture in warm weather, some heat may be abstracted from the edible mass, maintaining the latter hard for a long period. It is to be understood, however, that even with a dry container, the frozen mass will maintain its integrity and will adhere to the handle stick for many minutes, the shell having a heat-insulating effect.

The confection may be eaten entire or the chilled syrup sucked from the icy body, leaving a white mass of ice or snow on the stick. The cold mass has a relatively hard and polished surface upon which moisture from the atmosphere will condense as it is held in the hand preparatory to eating, thereby enhancing the attractiveness of the confection.

It is understood that instead of a water ice or sherbet mixture, a cream or ice cream mixture may be employed. However, the sherbet has particular advantages as it forms a mass which when frozen in the manner described, adheres with extraordinary tenacity about the stick and maintains its integrity for a surprisingly long period even in warm weather.

It will be obvious that the exteriors of the shells may be provided with any suitable indicia or decorative matter, either to identify the product or to enhance its attractiveness. It is also understood that the shell or mold may be formed of edible material such as a suitable biscuit.

Having thus described my invention, what I claim as new and desire to secure by Letters-Patent is:—

1. A confection comprising a stick, a mass of edible material frozen onto the stick and a form-retaining wrapper adherently connected to the material and having a finger tab by which said wrapper may be removed, said tab serving also to position the stick substantially axially of the wrapper during congelation.

2. A confection comprising an elongated frozen mass generally circular in cross-section, a stick comprising a core therefor, and extending the length thereof, a paper shell about said confection, said shell having means integral therewith for positioning said stick.

3. In a frozen confection, a mold forming a container for holding the confection when in a liquid form and dispensed with the confection as a wrapper when the confection is frozen, a stick forming a handle for supporting the confection when frozen, and means for retaining the stick in desired position during congelation of the confection including a part formed integrally with the mold and mechanically connected with the stick.

4. As a new article of manufacture, a confection including a mass of frozen edible material, a stick comprising a core and handle therefor, and a paper shell surrounding said confection and having means integral therewith for positioning said stick in the material.

5. As a new article of manufacture, a frozen confection including an open top form-retaining wrapper having integral means adjacent the top for mechanically supporting and positioning a stick therein, a stick extending into the wrapper to form a core and protruding therefrom to form a handle, and a mass of frozen edible material bonded to the stick and wrapper by congelation.

6. As a new article of manufacture, a confection including a mass of frozen edible material, a handle stick and an open top wrapper of material which can be removed in part from the frozen material, said wrapper having means adjacent the open top for supporting the handle stick in the liquid material prior to and during congelation.

MILTON SCHNAIER.